UNITED STATES PATENT OFFICE 2,426,982

PRODUCTION OF CELLULOSE ESTERS

Alvah Dale Clark and William F. Reichert, Meadville, Pa., assignors to American Viscose Corporation, Wilmington, Del., a corporation of Delaware No Drawing. Application December 6, 1944, Serial No. 566,952

4 Claims. (Cl. 260—227)

This invention relates to improvements in the production of organic esters of cellulose.

The production of cellulose esters by the so-called homogenous process (solution method) involves esterification of the cellulose by treatment thereof with an organic acid anhydride, in the presence of a catalyst and an organic diluent or solvent for the ester being formed. There is obtained, thus, a homogenous viscous solution of an ester which is substantially a tri-ester. In order to hydrolyze or saponify the tri-ester to a more lowly esterified product, which is of greater commercial importance, water is added to the tri-ester solution, commonly termed the primary acylation solution, in excess of the quantity required to convert remaining acid anhydride to the corresponding acid, and the solution is permitted to stand or ripen until the acyl content of the ester is decreased to the desired extent. Thereafter, water and/or other non-solvent for the cellulose is added in an amount sufficient to precipitate the cellulose ester from solution.

Although proposals have been advanced whereby both the esterification and hydrolysis reactions are effected at higher temperatures, experience has shown that, as a practical matter, both processes are best carried out at a temperature controlled so that it does not substantially exceed about 30° C. At such temperatures the esterification proceeds more uniformly and the product shows an improved filterability, and a more accurate control of the hydrolysis of the tri-ester to a less highly esterified form is possible so that the hydrolysis can be terminated precisely when the acyl content of the ester has reached the desired percentage.

In this respect, difficulty is encountered in maintaining the temperature constant due to the local overheating, and consequent sharp rise in temperature, which occur when water is added to the primary acylation solution as a result of the exothermic reaction of the water and excess anhydride, which reaction is almost instantaneous in the presence of the catalyst. When water in the liquid phase is added to the primary acylation solution, the temperature increase may be as great as 20° C. or more, even when precautions are taken and the water is added at an extremely slow rate. Due to the wide spread in the temperature of the primary acetylation solution upon the addition of water in the liquid phase thereto, it is impossible to accurately control the hydrolysis of the tri-acetate and those portions thereof which are overheated are hydrolyzed to a greater extent than the remaining portions, with the result that it is extremely difficult to obtain a product having the same average acyl content throughout, and the final product is not homogenous. Articles obtained from such esters, as for instance artificial fibers, films, or the like, do not possess uniform properties and are of generally inferior quality.

The present invention provides a method whereby an increase in temperature of the primary acylation solution is avoided, and the temperature is maintained at substantially not in excess of about 30° C. throughout the conversion of the excess anhydride to the corresponding acid, and subsequent hydrolysis of the primary ester in solution.

We have found that more accurate control of the hydrolysis of the primary ester, and hence a more homogenous final product, are obtained if, instead of water in the liquid phase, sufficient ice is added to the primary acylation solution to provide enough water to "kill" the excess acetic anhydride present therein, and effect hydrolysis of the tri-ester. The ice may be added in the form of fine shavings or coarser flakes. The heat generated by the reaction between the ice and anhydride is absorbed as latent heat of fusion of the ice, so that the temperature of the solution is not increased to any appreciable extent. This improvement permits of a more accurate control of the hydrolysis of the tri-ester, all of which is hydrolyzed at substantially the same rate and to the same extent, yielding a homogenous final product having improved properties and suitable for use in the preparation of articles, such as fibers, films, and so forth, of uniform and superior quality. The hydrolysis may be carried out to any desired extent, depending upon the solubility characteristics desired in the final product. Usually, in the case of cellulose acetate, for example, the hydrolysis is permitted to proceed under the controlled temperature conditions until the hydrolyzed ester is soluble in acetone. At the preferred temperatures indicated, i. e., not in excess of about 30° C., the hydrolysis proceeds at a somewhat slower rate than is the case at temperatures much above 30° C., which has the advantage that it permits remarkably close and accurate control over the progress of the deacylation of the tri-ester.

In practicing the invention, sufficient ice is added to the primary acylation solution to convert all excess acid anhydride present therein to the corresponding acid, and to reduce the concentration of the total acid present to about 95% with respect to water, after which the hydrolysis of the tri-ester is permitted to proceed in the acid solution. If desired, additional amounts of catalyst may be added to the solution, but generally the quantity of catalyst employed in the esterification process is sufficient.

In addition to permitting a more accurate control of the temperature and degree of deacetylation, thereby resulting in a more homogenous and uniformly deacylated product, the addition of the water in the form of ice for the purpose of "killing" the excess anhydride and inducing hydrolysis, has the adjunctive advantage that it permits a saving in the time required for the production of the cellulose esters. Thus, when water is added to the primary acylation solution considerable time is required and restoration of the temperature to the preferred working range takes a long time, even when resort is had to the use of external cooling means, as for instance the circulation of brine through a cooling jacket, so that equipment and chemicals are tied up for an unduly prolonged period and the time necessary for producing the esters is extended, thereby increasing the cost thereof. On the other hand, when ice is added to the primary acetylation solution in accordance with this invention, only about 15 minutes are required for the addition and since the exothermic heat generated disappears as latent heat of fusion of the ice and the temperature of the batch is not substantially altered, the use of extra external cooling means is unnecessary and time is not lost in adjusting the temperature back to the preferred range. Thus, the practice of our invention results in a more economical and time-conserving method of manufacturing cellulose esters, a saving of several hours being possible.

The invention may be practiced in connection with the manufacture of any suitable organic ester or mixed ester of cellulose, such as cellulose acetate, cellulose propionate, cellulose butyrate, or cellulose acetate-butyrate. The cellulose may be in any suitable form, as cotton, cotton linters, wood pulp, either sulfite, sulfate, or soda pulp, reconstituted cellulose, etc. The cellulose may or may not be activated by pre-treatment with lower aliphatic acids such as formic or acetic acids, or with alkali, etc. and part or all of the catalyst to be used in the esterification may be added to the pre-treating liquid, if desired. The esterifying agent will depend on the particular ester which it is desired to produce, and may be acetic anhydride, propionic anhydride, butyric anhydride or mixtures thereof. Other catalysts besides sulfuric acid may be employed, as for instance, zinc chloride, sodium bisulfate, methyl sulfate, etc. Any suitable liquid may be used as a solvent for the ester, including acetic acid, propionic acid, butyric acid, methylene chloride, etc.

For the purpose of further describing the invention there is given the following example, in which the parts are by weight.

*Example*

100 parts of cellulose are pre-treated by soaking for 3 hours in 50 to 100 parts of glacial acetic acid. The pre-treated cellulose is added to an acetylation medium consisting of 300 parts of acetic anhydride, 300 to 400 parts of glacial acetic acid, and 2 parts of sulfuric acid. The mixture is permitted to reach a temperature of 25 to 30° C., and is maintained within that range, while being continuously agitated, until a homogenous solution is obtained. 60 parts of ice are then added, to convert all excess acetic anhydride to acetic acid and to reduce the concentration of the total acetic acid present to 95% with respect to water. The 95% acetic acid solution of the ester is permitted to stand until the tri-acetate has been hydrolyzed to substantially a secondary acetate as evidenced by the solubility of a sample thereof in acetone, after which the solution is worked up in accordance with customary practice.

It will be understood that the foregoing detailed description is given merely by way of illustration and that modifications may be made therein without departing from the spirit of the invention, which is not to be limited except as defined by the appended claims.

We claim:

1. In the production of cellulose esters wherein cellulose is esterified in an excess of a lower fatty acid anhydride in a solvent for the ester containing a catalyst and at a temperature not substantially in excess of about 30° C., the excess anhydride present in the primary acylation solution is converted to the corresponding acid, and the cellulose ester present in the solution is hydrolyzed, the method of maintaining the solution at a temperature not substantially in excess of about 30° C., during the anhydride conversion and ester hydrolysis, which comprises adding ice to the primary acylation solution in an amount sufficient to convert all of the excess anhydride to acid, and to reduce the concentration of the total acid present in the solution to about 95% with respect to water.

2. In the production of cellulose acetate wherein cellulose is esterified in an excess of acetic anhydride in acetic acid containing a catalyst, and at a temperature not substantially in excess of about 30° C., the excess anhydride present in the primary acylation solution is converted to acetic acid, and the cellulose acetate present in the solution is hydrolyzed, the method of maintaining the solution at a temperature not substantially in excess of about 30° C., during the anhydride conversion and ester hydrolysis, which comprises adding ice to the primary acylation solution in an amount sufficient to convert all of the excess acetic anhydride to acetic acid, and to reduce the concentration of the total acid present in the solution to about 95% with respect to water.

3. In the production of cellulose esters wherein cellulose is esterified in an excess of a lower fatty acid anhydride in a solvent for the ester containing a catalyst, to produce a primary acylation solution, the excess anhydride present in the primary acylation solution is converted to the corresponding acid, and the cellulose ester present in the solution is hydrolyzed, the method of maintaining the primary acylation solution at a temperature not substantially in excess of about 30° C., during the anhydride conversion and ester hydrolysis, which comprises adding ice to the primary acylation solution in an amount sufficient to convert all of the excess anhydride to acid, and to reduce the concentration of the total acid present in the solution to about 95% with respect to water.

4. In the production of cellulose acetate wherein cellulose is esterified in an excess of acetic anhydride in acetic acid containing a catalyst to produce a primary acylation solution, the excess acetic anhydride present in the primary acylation solution is converted to acetic acid, and the cellulose acetate present in the solution is hydrolyzed, the method of maintaining the primary acylation solution at a temperature not substantially in excess of about 30° C., during the anhydride conversion and ester hydrolysis, which comprises adding ice to the primary acylation solution in an amount sufficient to convert all of the excess anhydride to acetic acid, and to reduce the concentration of the total acid present in the solution to about 95% with respect to water.

ALVAH DALE CLARK.
WILLIAM F. REICHERT.

REFERENCES CITED

The following references are of record in the file of this patent:

UNITED STATES PATENTS

| Number | Name | Date |
|---|---|---|
| 2,203,700 | Seymour et al. | June 11, 1940 |
| 2,007,510 | Thornton | July 9, 1935 |